Nov. 23, 1954

W. J. D. VAN DIJCK 2,695,367

PROCESS AND DEVICE FOR THE GENERATION
OF HIGH ELECTRIC VOLTAGES

Filed Nov. 1, 1951

Inventor
Willem Johannes Dominicus
van Dijk

United States Patent Office

2,695,367
Patented Nov. 23, 1954

2,695,367

PROCESS AND DEVICE FOR THE GENERATION OF HIGH ELECTRIC VOLTAGES

Willem Johannes Dominicus van Dijck, The Hague, Netherlands, assignor of one-half to Stichting voor Fundamenteel Onderzoek der Materie, Utrecht, Netherlands, a corporation of the Netherlands Application November 1, 1951, Serial No. 254,246

Claims priority, application Netherlands November 2, 1950

21 Claims. (Cl. 310—5)

The invention relates to a process for the generation of high electric voltages and to a device for application of this process.

High direct voltages, more or less constant, have been generated by charging a spherical body, insulated from earth, by blowing fine particles of infusorial-earth into said spherical body by means of compressed air. These particles first pass through a narrow copper tube in which they are charged by friction; thereupon they pass through a long glass insulated tube and finally give off their charge to small copper tubes within the sphere. Through another glass tube the dust particles fall back into the reservoir. The reliability of such a device, however, is not very good.

Another conventional method of generating high electric voltages is by the local forming of space charges in an insulating liquid, and subsequently passing this liquid to a device, such as a metal vessel, to which the space charges may be given off.

When the liquid has passed this device, said liquid is preferably returned to the place where the space charge is generated.

The present invention is based upon the realization that the high voltages which occasionally are accidentally observed if insulating liquids (such as kerosene) are pumped into a tank, are the result of so-called streaming potentials. These streaming potentials are well-known for aqueous solutions, in which they are caused by small quantities of ionizable substances, the differently charged parts of which are adsorbed in different ways by the wall of the tube. At a proper value of the concentration, the least strongly adsorbed part will be partly carried off by the liquid. Whereas with aqueous solutions merely low voltages can be generated, very high voltages may be obtained with insulating liquids by this process.

According to the invention a space charge is generated in an insulating liquid based on the above-mentioned principle of streaming potentials, by using a liquid containing a quantity of an ionizable substance, the variously charged ions of which are adsorbed in different degrees by metal and by passing this liquid along a metal, e. g. a system of metal tubes or slits, at which process at least part of the not or less strongly adsorbed ions are carried off by said insulating liquid.

The concentration of the ionizable substance in the insulating liquid is preferably adjusted in such a way that a maximal effect (with regard to the voltage to be obtained and/or the strength of current to be given off) is attained. If necessary a quantity of this substance may constantly or intermittently be added to the insulating liquid.

The strength of current to be generated is dependent on the velocity of flow along the wall, so that it is necessary to increase this velocity as much as possible, and preferably to work with a strong turbulent flow. Viz. in this latter case the charge which is carried along close to the wall, will spread through the liquid as a space charge.

By the electrical conductivity of the liquid and its dielectric constant, a half life value may be defined— that is to say the time in which half the charge of this liquid flows to the wall. When a liquid, charged in this way, is brought into a metal vessel, the charge will gradually flow towards the wall of the vessel, i. e. after one half life, the liquid will only have half the original charge left, and after twice the time of a half life, ¼ of the original charge will be left, etc.

In connection herewith the velocity of flow is chosen so that, during the process in question, the time elapsing between the generation of the space charge in a certain part of the liquid and its reaching the above-mentioned device, to which the charge is communicated is small when compared to the afore-mentioned half-life. Moreover care should be taken, e. g. by the selection of suitable dimensions of the device to which the charge is given off, during which the average time that a certain part of the liquid remains in said device, is large when compared to the time of average half-life.

The liquid, which has given off the greater part of its charge to the wall of the above-mentioned device may thereupon be returned to the metal tubes or slits via an insulating tube of adequate length. A pumping device has to be put into the circuit to effect the flow of the liquid. In this way a large difference of potential may be generated between the wall of the device and the wall of the metal slits or tubes.

The invention will be further explained with the help of the annexed drawings.

Figures 1, 2:
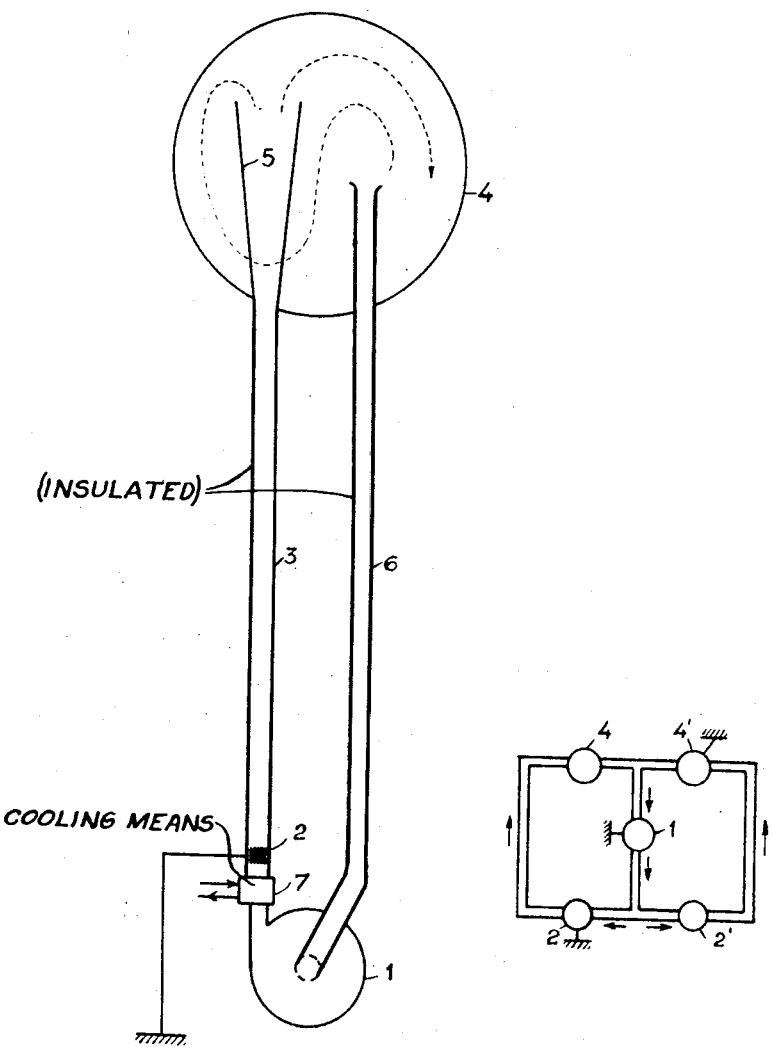
Fig. 1 is a schematical view of an apparatus, which is particularly suitable for the execution of the process according to the invention.
Fig. 2 is a schematic view of a second embodiment of apparatus incorporating the principles of the present invention showing means for obtaining still higher voltages by combining two apparatus in series.

Through a centrifugal pump 1 an insulating liquid, e. g. gasoline or kerosene or a pure hydrocarbon of low viscosity is forced through a packet of metal plates 2, preferably of iron, which are mounted at a small distance from each other (e. g. 1 mm.); the length of the plates in the direction of the flow amounts to about 5–10 times this distance, so that the turbulence may develop well. In general the length of this part of the apparatus must be about 3–5 times the hydraulic radius. Good results were obtained when this metal part was constructed as a disk with a length of 8 mm., provided with 200 vertical cylindrical holes with a diameter of 1 mm., and a quantity of 5000 liters of insulating liquid/hour was forced through these holes. The system of metal plates is connected to earth. Thereafter the liquid flows through an insulating tube 3 to a metal storage vessel 4, preferably a copper vessel, which is insulated. When used in combination with the aforementioned disk the diameter of these tubes has to be about 35–40 mm. with a length of about 1.5 meters. In order to avoid undesired turbulences in this storage vessel, the liquid flows first through a metal Venturi-tube 5. In this vessel the liquid will move approximately along the lines of flow indicated by the dotted lines, at the same time giving off its charge to the wall of the vessel. From here, the liquid is sucked off via an insulating tube 6 and returned to the suction side of the centrifugal pump 1. In order to remove the heat which is generated by friction, a cooling device 7 may, if necessary, be put into the circuit, preferably between the pump 1 and the metal plates 2.

Preferably an organic liquid of low viscosity is used as an insulating liquid, such as hydrocarbons, gasoline and kerosene, as otherwise too much energy is required to circulate the liquid. Also halogenated hydrocarbons and carbon disulfide may be applied, the advantage thereof being less danger of an arcing discharge in the gaseous state than when hydrocarbons are used.

Various soaps and soapy substances such as sulphonates have proved to be very suitable as ionizable substances with various degrees of adsorption. The optimal concentrations are between 0.001 and 0.1%. Very good results were obtained with a liquid, consisting of gasoline I. P., containing 0.01% by weight of magnesiumsulphonate. Used in combination with the described apparatus having a disk with 200 holes, a voltage of 50,000 volts could be generated, when a current of 0.5 $\mu$amp. was taken off. A suitable half life is about 5 seconds. This half life may be adjusted by changing the conductivity which may be strongly increased by the addition of bituminous substances. The distance from the plates 2 to the storage vessel 4 will depend on the desired voltage, but will usually amount to several meters. In consequence thereof, the velocity of flow in the tubes 3 and 6 must be in the neighborhood of 5 to 10 m. per second, to traverse the distance from point 2 to point 4 in a time which is short compared to the half life. The dimensions of the vessel 4 must be chosen so that the time during which the liquid remains within the vessel amounts to at least 3–5 times the half life. The minimum radius for the case where the vessel is a sphere, is also determined on the basis of electrical considerations, by the requirement that no spraying effects may occur. In combination with the aforementioned disk with 200 holes, a sphere was used with a radius of about 18 cm. The apparatus must be provided with means for filling and de-aerating.

It is not necessary that the device 2 be connected to earth or that the storage vessel 4 be insulated. The device 2 or the vessel 4 need only be connected to some reference potential source of sufficient capacity.

In principle the process may also be carried out in reverse, as long as the device 2 is constructed in a suitable way, e. g. that it is mounted within an insulated hollow metal sphere of adequate dimensions, and that the metal slits are electrically connected with the sphere.

A number of circuits may be put in series in order to obtain a higher voltage. In Figure 2 is schematically indicated how a double voltage could be generated by means of two circuits. Both circuits are served by the pump 1. If the storage vessel 4 which is insulated, is charged positively when compared to the device 2, the insulated device 2' will be charged negatively when compared to the storage vessel 4'. Device 2 and the storage vessel 4' are connected to earth.

The high voltage now occurs between the device 2' and the storage vessel 4.

I claim:

1. Apparatus for generating high electrical voltages, comprising, in combination, a liquid conveying means arranged in a closed path for circulating a liquid; an insulating liquid carrying an ionizable substance located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means spaced from said first part thereof, for accumulating the charge produced at said first part of said liquid conveying means, said conductive vesel forming part of said liquid conveying means; and insulating means located between said means for generating a space charge and said conductive vessel for insulating the same from each other, said insulating means forming part of said liquid conveying means.

2. Apparatus for generating high electrical voltages comprising, in combination, a liquid conveying means arranged in a closed path for circulating a liquid; an insulating liquid carrying an ionizable substance and a bituminous product located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means.

3. Apparatus for generating high electrical voltages comprising, in combination, a liquid conveying means arranged in a closed path for circulating a liquid; an insulating liquid having a soap dissolved therein located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means.

4. Apparatus for generating high electrical voltages comprising, in combination, a liquid conveying means arranged in a closed path for circulating a liquid; an insulating liquid carrying an ionizable substance, said ionizable substance being 0.001–0.1% of the liquid volume, said liquid located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means spaced from said first part thereof, for accumulating the charge produced in the liquid and said first part of said liquid conveying means, said conductive vessel forming part of said liquid conveying means; and insulating means located between said means for generating a space charge and said conductive vessel for insulating the same from each other, said insulating means forming part of said liquid conveying means.

5. Apparatus for generating high electrical voltages comprising, in combination, a liquid conveying means arranged in a closed path for circulating a liquid; an insulating liquid carrying an ionizable substance consisting of at least one sulphonate located in said liquid conveying means; a source of reference potential; means for generating a space charge mounted in a first portion of said conveying means and constructed as a metallic member connected to said source of reference potential to be contacted by the liquid passing therethrough thereby producing a space charge in the liquid as a result of the selective adsorption of ions present in the liquid by said metallic member; a conductive vessel located at a second part of said liquid conveying means spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means.

6. Apparatus for generating high electrical voltages comprising, in combination, a liquid conveying means arranged in a closed path for circulating a liquid; an insulating liquid carrying an ionizable substance and having a high resistance against breaking down in the gaseous state, located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means spaced from said first part thereof, for accumulating the charge produced in the liquid at said first part of said liquid conveying means said conductive vessel forming part of said liquid conveying means; and insulating means located between said means for generating a space charge and said conductive vessel for insulating the same from each other, said insulating means forming part of said liquid conveying means.

7. Apparatus for generating high electrical voltages comprising, in combination, a liquid conveying means arranged in a closed path for circulating a liquid; an insulating liquid having a high resistance against breakdown and having therein a halogenated hydrocarbon of low viscosity and carrying an ionizable substance, located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other said insulating means forming part of said liquid conveying means.

8. Apparatus for generating high electrical voltages comprising, in combination, a liquid conveying means arranged in a closed path for circulating a liquid; an insulating liquid carrying an ionizable substance located in said conveying means; means for generating a space charge mounted in a first portion of said conveying means and constructed as grounded narrow metallic tubes to be contacted by the liquid passing therethrough thereby producing a space charge in the liquid as a result of the selective adsorption of ions present in the liquid by said metallic tubes; a conductive vessel located at a second part of said liquid conveying means, spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means.

9. Apparatus for generating high electrical voltages comprising, in combination, a liquid conveying means arranged in a closed path for circulating a liquid; an insulating liquid carrying an ionizable substance located in said liquid conveying means; means for generating a space charge mounted in a first portion of said conveying means and constructed as grounded narrow metallic tubes spaced approximately 1 mm. apart, the height of said tubes in the direction of liquid flow being approximately 5–10 mm. to be contacted by the liquid passing therethrough thereby producing a space charge in the liquid as a result of the selective adsorption of ions present in the liquid by said metallic tubes; a conductive vessel located at a second part of said liquid conveying means, spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means.

10. Apparatus for generating high electrical voltages comprising, in combination, a liquid conveying means arranged in a closed path for circulating a liquid; an insulating liquid carrying an ionizable substance located in said liquid conveying means; means for generating a space charge mounted in a first portion of said conveying means and constructed as grounded metallic slits to be contacted by the liquid passing therethrough thereby producing a space charge in the liquid as a result of the selective adsorption of ions present in the liquid by said metallic slits; a conductive vessel located at a second part of said liquid conveying means, spaced from said first part thereof, for accumulating the charge produced in the liquid at said first part of said liquid conveying means; and insulating means located between said means for generating a space charge and said conductive vessel for insulating the same from each other, said conductive vessel forming part of said liquid conveying means.

11. Apparatus for generating high electrical voltages comprising, in combination, a liquid conveying means arranged in a closed path for circulating a liquid; an insulating liquid carrying an ionizable substance located in said liquid conveying means; means for generating a space charge mounted in a first portion of said conveying means and constructed as a grounded metallic member having a large wall surface to be contacted by the liquid passing therethrough thereby producing a space charge in the liquid as a result of the selective adsorption of ions present in the liquid by said metallic member; a conductive vessel located at a second part of said liquid conveying means, spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means.

12. Apparatus for generating high electrical voltages comprising, in combination, a liquid conveying means arranged in a closed path for circulating a liquid; an insulating liquid carrying an ionizable substance located in said liquid conveying means; means for circulating a liquid through said conveying means in a turbulent motion, said circulating means forming part of said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means, spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means.

13. Apparatus for generating high electrical voltages comprising, in combination, a liquid conveying means arranged in a closed path for circulating a liquid; an insulating liquid carrying an ionizable substance located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive sphere located at a second part of said liquid conveying means, spaced from said first part thereof, for accumulating the charge produced in the liquid at said first part of said liquid conveying means, said conductive sphere forming part of said liquid conveying means; and insulating means located between said means for generating a space charge and said conductive sphere for insulating the same from each other, said insulating means forming part of said liquid conveying means.

14. Apparatus for generating high electrical voltages comprising, in combination, a liquid conveying means arranged in a closed path for circulating a liquid; an insulating liquid carrying an ionizable substance located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a metal vessel located at a second part of said liquid conveying means, spaced from said first part thereof, for accumulating the charge produced in the liquid at said first part of said liquid conveying means, said metal vessel forming part of said liquid conveying means; and insulating means located between said means for generating a space charge and said metal vessel for insulating the same from each other, said insulating means forming part of said liquid conveying means.

15. Apparatus for generating high electrical voltages comprising, in combination, a liquid conveying means arranged in a closed path for circulating a liquid; an insulating liquid carrying an ionizable substance located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means, spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means and having a length such that the time which lapses between the generation of the space charge in the liquid and its accumulating on said conductive vessel is short compared to the half-life of the charge.

16. Apparatus for generating high electrical voltages comprising, in combination, a liquid conveying means arranged in a closed path for circulating a liquid; an insulating liquid carrying an ionizable substance located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means, and having a diameter of 35–40 mm. and a length of about 1.5 meters.

17. Apparatus for generating high electrical voltages comprising, in combination, a liquid conveying means arranged in a closed path for circulating a liquid; an insulating liquid carrying an ionizable substance located in said liquid conveying means; means for generating a space charge mounted in a first portion of said conveying means and constructed as a grounded metallic member to be contacted by the liquid passing therethrough thereby producing a space charge in the liquid as a result of the selective adsorption of ions present in the liquid by said metallic member; a conductive vessel located at a second part of said liquid conveying means, spaced from said first part thereof, for accumulating the charge produced in the liquid at said first part of said liquid conveying means, said conductive vessel forming part of said liquid conveying means; and insulating means located between said means for generating a space charge and said conductive vessel for insulating the same from each other, said insulating means forming part of said liquid conveying means; and cooling means connected to said liquid conveying means for cooling the liquid flowing therethrough.

18. Apparatus for generating an electrostatic potential comprising, in combination, conduit means; an insulating liquid having an ionizable substance dissolved therein located in said conduit means; means operatively associated with said conduit means for circulating said insulating liquid through said conduit means; a source of reference potential; conductive space charge generating means mounted in a first portion of said conduit means and in contact with said insulating liquid for producing a space charge in said insulating liquid by selectively adsorbing therefrom a portion of the ions present in said insulating liquid, said space charge generating means being connected to said source of reference potential; conductive vessel means located at a second part of said conduit means, spaced from said first part thereof, for accumulating the charge produced in said insulating liquid at said first part of said conduit means, said conductive vessel means forming a part of said conduit means; and insulating conduit means located between said space charge generating means and said conductive vessel means for insulating the same from each other, said insulating conduit means forming part of said conduit arrangement.

19. Apparatus for generating an electrostatic potential as set forth in claim 18 wherein said insulating conduit means has a length such that the time which lapses between the generation of the space charge in said insulating liquid and its accumulating on said conductive vessel means is short compared to the half life of said charge.

20. A process for generating an electrostatic potential comprising the steps of producing a space charge in an insulating liquid having an ionizable substance therein by selectively adsorbing therefrom a portion of the ions therein; passing the charged liquid through an insulating conduit at a speed sufficient so that only a minor part of said space charge is lost during the passage of said liquid through said insulating conduit; and collecting from the liquid after it has passed through said insulating conduit the charge therein.

21. A process of generating an electrostatic potential comprising the steps of producing a space charge in an insulating liquid having an ionizable substance therein by selectively adsorbing therefrom a portion of the ions therein; passing the charged liquid through an insulating conduit at a speed sufficient so that only a minor part of said space charge is lost during the passage of said liquid through said insulating conduit; collecting from the liquid after it has passed through said insulating conduit the charge therein; cooling the liquid after the charge has been collected therefrom; and continuously repeating all of the preceding steps in the order named.

References Cited in the file of this patent

UNITED STATES PATENTS

| Number | Name | Date |
|---|---|---|
| 2,078,760 | Hansell | Apr. 27, 1937 |
| 2,208,217 | Landerholm | July 16, 1940 |
| 2,308,884 | Lindenblad | Jan. 19, 1943 |
| 2,572,765 | Roudaut | Oct. 23, 1951 |
| 2,577,542 | Roudaut | Dec. 4, 1951 |

FOREIGN PATENTS

| Number | Country | Date |
|---|---|---|
| 812,996 | France | Feb. 15, 1937 |

OTHER REFERENCES

Physical Review, vol. 42, pp. 298–304, October 15, 1932.